Figure 1:
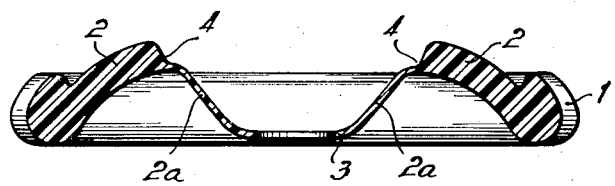

April 1, 1958 K. WILFERT 2,828,645
COMBINATION OF A STEERING WHEEL WITH A SIGNALLING RING
COAXIALLY IMPOSED THEREON FOR MOTOR VEHICLES
Filed Dec. 24, 1956

INVENTOR
KARL WILFERT
BY Dieke and Craig
ATTORNEYS.

United States Patent Office 2,828,645
Patented Apr. 1, 1958

2,828,645

COMBINATION OF A STEERING WHEEL WITH A SIGNALLING RING COAXIALLY IMPOSED THEREON FOR MOTOR VEHICLES

Karl Wilfert, Stuttgart-Degerloch, Germany, assignor to Daimler-Benz Aktiengesellschaft, Stuttgart-Untertürkheim, Germany Application December 24, 1956, Serial No. 630,289

Claims priority, application Germany December 24, 1955

2 Claims. (Cl. 74—484)

My invention relates to a steering wheel for automobiles.

As a rule it is the proper practice for the driver to grip the steering wheel by its rim. Many drivers are in the habit, however, to grip the steering wheel by its spokes, particularly while driving in relaxed condition through extended straight stretches. When it happens that the driver is compelled by a suddenly intervening obstruction or an unexpected curve of the road to turn the steering wheel rapidly, then a steering wheel of the conventional shape in which the spokes extend in the plane of the rim or a steering wheel having spokes extending beneath such plane has the disadvantage that the rim will press against the driver's wrist of that hand which is gripping the spoke moving towards the driver when the steering wheel is turned. Therefore, the driver is forced, to sharply bend his hand downwardly involving the risk that his hand may slip off the wheel. This is particularly likely to happen with steering wheels having spokes of an unwieldy cross-sectional profile which cannot be gripped very firmly.

It is the primary object of the present invention to provide a steering wheel which is free from the aforestated objections and affords a possibility to keep it under firm control when gripped by its spokes. It is another object of my invention to provide an improved steering wheel permitting to mount the signalling ring in sheltered position.

Further objects of my invention will appear from a detailed description of a preferred embodiment described hereinafter with reference to the accompanying drawing. It is to be understood, however, that the invention is in no way limited to the details of such embodiment and that the terms and phrases used in such detailed description have been chosen for the purpose of explanation rather than that of restriction or limitation of the invention, the features of novelty for which protection is sought being set forth in the appended claims.

In the drawing

Figure 2:
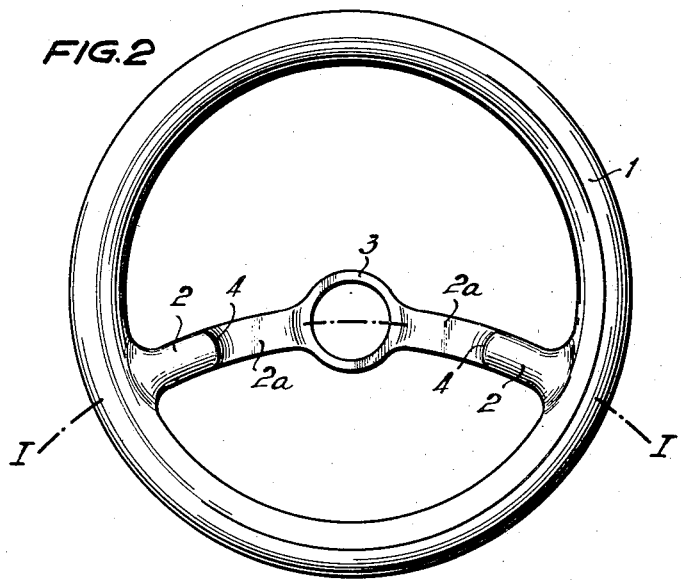
Figure 3:
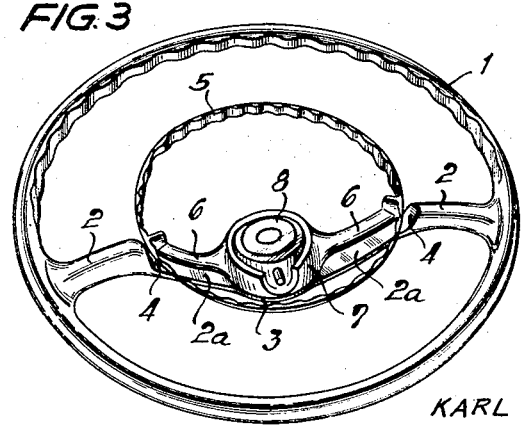

Fig. 1 is a cross-section through the steering wheel taken along the line 1—1 shown in Fig. 2, Fig. 2 is a plan view of the steering wheel shown in Fig. 1 and Fig. 3 is a perspective view of the combination with a signalling ring of the steering wheel illustrated in Figs. 1 and 2, Fig. 3 being on a smaller scale than Figs. 1 and 2.

The steering wheel is composed of an annular hub member 3, of an annular rim member 1 surrounding said hub member 3, and of spokes 2 connecting such members and extending beneath a signalling ring 5 shown in Fig. 3 which is carried by and coaxially mounted on top of the steering wheel and serves the purpose of operating a horn and turn-indicating lamps. Preferably the steering wheel has but two of such spokes 2 which are so shaped that their projection upon the plane of the steering wheel forms a slightly curved arc indicated by the line 1—1 in Fig. 2. This arc intersects the rim at points spaced apart substantially less than 180°, for instance about 150°. As will appear from Fig. 2, the hub portion may be disposed slightly off center with respect to the rim 1. As a result, both the spokes 2 and the hub portion 3 are disposed within the lower half of the area surrounded by the rim 1.

Each of the spokes 2 has a relatively thick outer section disposed outside the signalling ring 5 and a relatively thin flat inner section 2a which joins the flat hub member 3. Preferably, the spokes are integral with the rim member 1 and the hub member 3.

For the purpose of the present invention the relatively thick outer section of each spoke extends above the top plane of the rim member 1 as will appear from Fig. 1. From the inner ends of the thick outer spoke sections, the relatively thin flat inner sections are bent downwardly towards the hub member 3 and are smoothly curved at the points of junction with the outer spoke sections and the hub member. Because of the difference of the thickness of the outer section and the inner section of the spoke, an inwardly facing shoulder 4 is formed between the sections. These shoulders 4 are disposed in opposed adjacent relationship to the periphery of the signalling ring 5.

The thick spoke sections 2 projecting upwardly and inwardly from the rim member 1 have preferably a cylindrical or oval cross-section and, therefore, may be easily gripped by the driver and thus constitute handles affording a firm grip of the steering wheel. The length of the thick outer section of each spoke may amount from ⅓ to ½ of the entire radial length of the spoke 2.

From the above description it will appear that the signalling ring 5 is so dimensioned, shaped and mounted as to just fit between the shoulders 4. Preferably the signalling ring has a pair of spokes 6 which are normally disposed above the thin flat inner spoke sections 2a. If desired, the signalling ring 5 may have a hub 7 in which an instrument 8 may be inserted.

The upwardly curved thick outer spoke sections 2 afford the advantage that when gripped by the driver may be held by his hands without interference by the rim member 1, when the wheel is turned.

While the invention has been described in connection with a preferred embodiment thereof, it will be understood that it is capable of further modification, and this application is intended to cover any variations, uses, or adaptations of the invention following in general, the principles of the invention and including such departures from the present disclosure as come within known or customary practice in the art to which the invention pertains, and as fall within the scope of the invention or the limits of the appended claims.

What I claim is:

1. In a motor vehicle, the combination with a signalling ring a coaxially disposed steering wheel which comprises an annular hub member, an annular rim member surrounding said hub member, and spokes connecting said members and extending beneath said signalling ring, each of said spokes having a relatively thick outer section outside of said signalling ring extending above the top plane of said rim member and a relatively thin flat inner section and an inwardly facing shoulder between said sections in opposed adjacent relationship to the periphery of said signalling ring, said outer sections of said spokes constituting handles.

2. The combination claimed in claim 1 in which said steering wheel has but two of said spokes being so shaped that their projection upon said plane forms a slightly curved arc of a circle intersecting said rim at points spaced apart substantially less than 180°.

No references cited.